May 14, 1929.  F. H. WINTER  1,713,155
SYSTEM OF ELECTRICAL DISTRIBUTION
Filed May 28, 1926
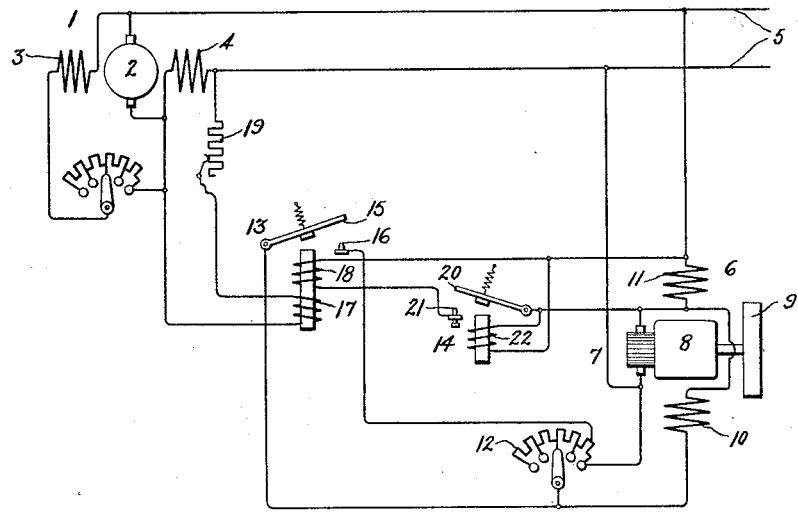
Inventor:
Fred H. Winter;
by *His Attorney*

Patented May 14, 1929.

1,713,155

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed May 28, 1926. Serial No. 112,393.

My invention relates to systems of distribution and in particular to systems wherein a fly-wheel equalizer set is employed to equalize the load upon the main source of electrical energy which supplies power to a distribution circuit, when the load upon said circuit is subject to rapid fluctuations, as is the case when motors for rolling mills, cranes, hoists, etc., are operated therefrom.

In many electrical systems subject to intermittent or widely variable loads, it has been common practice to employ automatic means responsive to the load upon the main source of electrical energy to regulate the operations of a fly-wheel equalizer set and to cause it to assume the load in excess of a predetermined load upon the main source. Under certain conditions, which may exist at certain periods in the operation of the system, if the regulation of the operation of the equalizer set depends solely upon the load upon the main source, the current traversing the equalizer set may exceed the maximum current capacity thereof. Accordingly, arrangements have been proposed for protecting the fly-wheel equalizer set from overloads, but in the arrangements proposed in which the regulator equipment includes overload protection for both motor and generator operation, a complicated control system involving a plurality of regulators and current directional devices has been found necessary.

An object of my invention is to provide an improved regulating equipment in systems of the type referred to, which is simple and reliable in operation for regulating and protecting a fly-wheel equalizer set, when operating either as a motor or as a generator.

In accordance with my invention I provide a distribution system comprising a main source of electrical supply, a distribution circuit connected thereto and adapted to be supplied with current thereby, a fly-wheel equalizer set comprising a dynamo-electric machine having an armature connected across said circuit and adapted to operate either as a motor or as a generator, and a single regulator cooperating with a relay for regulating and protecting the equalizer set in accordance with the current from the main source and the current traversing the dynamo-electric machine.

My invention will be better understood from the following description taken in connection with the accompanying drawing in which the single figure is a diagrammatic representation of one embodiment of the invention, and its scope will be pointed out in the appended claims.

In the drawing, a source of electrical energy consisting of a generator 1 having an armature 2, a shunt field winding 3, and a series field winding 4, is connected to the distribution circuit 5 and is adapted to supply current thereto. A fly-wheel equalizer set is designated by 6 and comprises a dynamo-electric machine 7 having an armature 8, a fly-wheel 9, a shunt field winding 10, and a series field winding 11. An adjustable resistance 12 is inserted in series with the field winding 10. The fly-wheel 9 is mechanically connected to rotate with the armature 8, which is connected across the distribution circuit 5.

To control the operation of the equalizer set, a regulator 13 and a relay 14 are employed and, as conventionally shown, are of the vibratory type. The regulator 13 comprises cooperating contacts 15 and 16, and operating coils 17 and 18. The operating coil 17 is connected to be responsive to the current supplied by generator 1, and, for convenience, is connected across the series field 4. An adjustable resistance 19 is connected in series with operating coil 17 in order to provide means to make any initial adjustments for maintaining a predetermined current from generator 1. The operating coil 18 is connected to be responsive to the current traversing the dynamo-electric machine 7 and, for convenience, is connected across the series field winding 11. The energization of the operating coil 18 is controlled by relay 14. The coil 18 is arranged to act differentially with respect to coil 17, when the dynamo-electric machine 7 is operating as a generator, and is arranged to act accumulatively with respect to coil 17, when the dynamo-electric machine 7 is operating as a motor. The relay 14 comprises cooperating contacts 20 and 21, and an operating coil 22. The operating coil 22 is arranged to be energized in accordance with the current traversing the dynamo-electric machine 7 and, for convenience, is connected across the series field winding 11.

The operation of the arrangement shown is as follows: Assume generator 1 to be in operation and to be supplying a predetermined current, such as its normal rated current, to the distribution circuit 5. Assume, also, the dynamo-electric machine 7 to be in operation and connected across the mains 5 to consume sufficient current to supply its losses. For purposes of explanation, let it be assumed that the operating coil 17 of regulator 13 has been adjusted by means of resistance 19 to tend to hold the current delivered by generator 1 at a predetermined value, such as 4000 amperes, and that relay 14 has been adjusted to close its contacts 20—21 when the current traversing the dynamo-electric machine exceeds a predetermined value, such as 2500 amperes.

Under the conditions assumed, the fly-wheel equalizer set will be operating at a constant speed, and the generator 1 will be delivering 4000 amperes to the distribution circuit 5. Now assume the load demand to be increased to 5000 amperes. The increase in current demand causes operating coil 17 to be energized sufficiently to close contacts 15—16, and thereby shortcircuit the resistance 12 in the field circuit of dynamo-electric machine 7. The field excitation of the dynamo-electric machine 7 is thereby increased. Since the fly-wheel 9 tends to maintain the speed of the equalizer set constant, the dynamo-electric machine 7 now acts as a generator and will supply the excess current demand until the energy stored in the rotating parts is consumed. When the load current demand decreases below 4000 amperes, the dynamo-electric machine 7 will operate as a motor and cause the equalizer set to accelerate to a speed corresponding to the voltage of the mains and the minimum field excitation maintained. An increase in current is thereby required from generator 1 for accelerating the rotating mass. This alternate generator and motor operation of the dynamo-electric machine 7 will tend to maintain a substantially constant current output from generator 1.

Now suppose the total load increases to 7000 amperes. Since generator 1 is arranged to supply 4000 amperes, the regulating set under the normal operation of regulator 13 will tend to furnish 3000 amperes, but this current is beyond the limit for which protection is desired. However, when the current exceeds 2500 amperes, relay 14 closes its contacts 20—21 and completes an energizing circuit for operating coil 18. Since coil 18 is arranged to operate differentially with respect to coil 17 under these conditions, the closing effect of coil 17 is thereby diminish to such an extent that contacts 15—16 are disengaged. Resistance 12 is thereby inserted in the field circuit of dynamo-electric machine 7 and the current traversing the equalizer set is prevented from increasing beyond the predetermined limit. Since the equalizer set cannot deliver current in excess of 2500 amperes, and the total load is 7000 amperes, the excess over 6500 amperes, in addition to the 4000 amperes, will be carried by generator 1.

When the opposite condition occurs, that is, when the load drops to 1000 amperes, the equalizer set tends to accelerate with minimum field excitation and will normally tend to draw 3000 amperes in an attempt to equalize the generator load. Under these conditions, regulator 13 would not normally close its contacts and the equalizer set would again be overloaded. However, relay 14 will close its contacts 20—21, and coil 18, being energized by a current in the opposite direction for the motor operation, will act accumulatively with coil 17 and cause regulator 13 to close its contacts 15—16. This increases the field excitation of the dynamo-electric machine 7, and lessens the extent of acceleration and thereby the current consumed from exceeding the predetermined value.

While I have shown and described a particular embodiment of my invention, it will be obvious to those skilled in the art that changes and modifications may be made without departing from my invention, and I, therefore, aim in the appended claims to cover all such changes and modification as fall within the true spirit and scope of my invention.

What I claim as new and desire to secure by Letters Patent of the United States is:—

1. In combination, a source of electrical energy, a distribution circuit adapted to be supplied with current thereby, an equalizer set comprising a fly-wheel and a dynamo-electric machine connected to said circuit, and means comprising a regulator responsive to the current from said source for causing said dynamo-electric machine to operate either as a generator or as a motor, and means operative in accordance with the current traversing said dynamo-electric machine for modifying the action of said regulator for limiting the value of the current traversing said dynamo-electric machine during both its motoring and generating operation.

2. In combination, a source of electrical energy, a distribution circuit adapted to be supplied with current thereby, an equalizer set comprising a fly-wheel and a dynamo-electric machine connected to said circuit, a regulator comprising a coil responsive to the current from said source for causing said dynamo-electric machine to operate either as a generator or as a motor, and means responsive to the current traversing said dynamo-electric machine for modifying the action of said regulator coil for limiting the value of the current traversing said dynamo-electric machine during generator operation.

3. In combination, a source of electrical energy, a distribution circuit adapted to be supplied with current thereby, an equalizer set comprising a fly-wheel and a dynamo-electric machine connected to said circuit, a regulator comprising a coil responsive to the current from said source for causing said dynamo-electric machine to operate either as a generator or as a motor, and means comprising a coil responsive to the current traversing said dynamo-electric machine for acting accumulatively with said first mentioned coil for limiting the value of the current traversing said dynamo-electric machine during motor operation.

4. In combination, a source of electrical energy, a distribution circuit connected thereto, an equalizer set comprising a fly-wheel and a dynamo-electric machine connected to said circuit, an automatic regulator responsive to the current supplied to said distribution circuit by said source of regulating the operation of said equalizer set, and a relay responsive to the current traversing said dynamo-electric machine for modifying the regulating effect of said regulator and for limiting the value of the current traversing said dynamo-electric machine during generating and motoring operation.

5. In combination, a source of electrical energy, a distribution circuit connected thereto, an equalizer set comprising a fly-wheel and a dynamo-electric machine connected to said circuit, a regulator comprising operating windings responsive respectively to the current supplied by said source and the current traversing said equalizer set for controlling the operation of said dynamo-electric machine, and a relay for rendering said operating winding responsive to the current traversing said dynamo-electric machine inoperative when the current traversing said equalizer set is below a predetermined value and for rendering said winding effective to modify the operation of said regulator when the current traversing said equalizer set is above a predetermined value.

6. In combination, a source of electrical energy, a distribution circuit connected thereto, an equalizer set comprising a fly-wheel and a dynamo-electric machine adapted for generator or motor operation connected to said circuit, a regulator comprising cooperating contacts and operating coils responsive respectively to the current supplied by said source and the current traversing said dynamo-electric machine, a field winding for said dynamo-electric machine, a resistance connected in a circuit with said field winding, said regulator contacts being normally arranged for effecting the short-circuiting of said resistance when the current supplied by said source is above a predetermined value and for effecting the insertion of said resistance when the current supplied by said source is below a predetermined value, a relay responsive to the current traversing said dynamo-electric machine for rendering one of said operating coils operative to effect opening of said regulator contacts when the current traversing said dynamo-electric machine during generator operation is above a predetermined value and for rendering said operating coil operative to effect closing of said regulator contacts when the current traversing said dynamo-electric machine during motoring operation is above a predetermined value.

In witness whereof I have hereunto set my hand this 27th day of May, 1926.

FRED H. WINTER.